US012688516B2

(12) United States Patent
Fu et al.

(10) Patent No.: US 12,688,516 B2
(45) Date of Patent: Jul. 21, 2026

(54) OBJECT DISPLAY METHOD AND APPARATUS, AND ELECTRONIC DEVICE AND COMPUTER-READABLE MEDIUM

(71) Applicant: Beijing Youzhuju Network Technology Co., Ltd., Beijing (CN)

(72) Inventors: Qiang Fu, Beijing (CN); Liya Li, Beijing (CN); Jiali Hu, Beijing (CN); Zhiyao Xie, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/854,042

(22) PCT Filed: May 23, 2023

(86) PCT No.: PCT/CN2023/095717
§ 371 (c)(1),
(2) Date: Oct. 3, 2024

(87) PCT Pub. No.: WO2024/012059
PCT Pub. Date: Jan. 18, 2024

(65) Prior Publication Data
US 2025/0227317 A1     Jul. 10, 2025

(30) Foreign Application Priority Data
Jul. 12, 2022    (CN) ......................... 202210822634.X

(51) Int. Cl.
H04N 21/254     (2011.01)
G06V 10/74     (2022.01)
H04N 21/2187     (2011.01)

(52) U.S. Cl.
CPC ....... *H04N 21/2542* (2013.01); *G06V 10/761* (2022.01); *H04N 21/2187* (2013.01)

(58) Field of Classification Search
None
See application file for complete search history.

(56) References Cited

U.S. PATENT DOCUMENTS

| | | | | |
|---|---|---|---|---|
| 10,440,436 B1 * | 10/2019 | Taylor | .................. | H04N 21/812 |
| 2016/0381427 A1 * | 12/2016 | Taylor | .................. | H04N 21/472 |
| | | | | 725/13 |

(Continued)

FOREIGN PATENT DOCUMENTS

| | | |
|---|---|---|
| CN | 106791904 A | 5/2017 |
| CN | 109636514 A | 4/2019 |

(Continued)

OTHER PUBLICATIONS

ISA China National Intellectual Property Administration, International Search Report and Written Opinion Issued in Application No. PCT/CN2023/095717, Aug. 21, 2023, WIPO, 11 pages.

(Continued)

*Primary Examiner* — William J Kim
(74) *Attorney, Agent, or Firm* — Alleman Hall LLP

(57) ABSTRACT

An object display method and apparatus, and an electronic device and a computer-readable medium are provided. The method includes: displaying at least one object to be displayed corresponding to a video playing page in an object display area of the video playing page; and displaying an object aggregation page in response to a triggering operation on the object display area. The object aggregation page is configured for displaying at least one candidate object; a matching degree between the candidate object and a target object meets a preset matching condition; and the target object is determined from the at least one object to be displayed according to description information of the at least one object to be displayed.

14 Claims, 8 Drawing Sheets

(56)     References Cited

U.S. PATENT DOCUMENTS

| | | | |
|---|---|---|---|
| 2018/0152764 A1* | 5/2018 | Taylor ............... | G06Q 30/0623 |
| 2021/0370177 A1 | 12/2021 | Li | |
| 2023/0101302 A1 | 3/2023 | Chen | |
| 2024/0348863 A1 | 10/2024 | Zhang | |

FOREIGN PATENT DOCUMENTS

| | | | |
|---|---|---|---|
| CN | 111753158 A | 10/2020 |
| CN | 112016986 A | 12/2020 |
| CN | 112613948 A | 4/2021 |
| CN | 113286204 A | 8/2021 |
| CN | 113949888 A | 1/2022 |
| CN | 114546565 A | 5/2022 |
| CN | 114640877 A | 6/2022 |

OTHER PUBLICATIONS

China National Intellectual Property Administration, Office Action and Search Report Issued in Application No. 202210822634.X, Oct. 23, 2025, 18 pages.

\* cited by examiner

OBJECT DISPLAY METHOD AND APPARATUS, AND ELECTRONIC DEVICE AND COMPUTER-READABLE MEDIUM

CROSS-REFERENCE TO RELATED APPLICATIONS

The present application claims the benefit of the priority from the International Patent Application No. PCT/CN2023/095717 and the CN patent for invention application No. 202210822634.X, titled as "OBJECT DISPLAY METHOD AND APPARATUS, AND ELECTRONIC DEVICE AND COMPUTER-READABLE MEDIUM" filed with the China National Intellectual Property Administration on Jul. 12, 2022, which is hereby incorporated by reference in its entirety into the present application.

TECHNICAL FIELD

The present disclosure relates to the technical field of Internet, in particular to an object display method and apparatus, and electronic device and computer-readable medium.

BACKGROUND ART

Live streaming is a kind of information network publishing method with two-way circulation process, which produces and publishes information synchronously with the occurrence and development of events on the spot.

With the rapid development of live streaming technology, there are more and more application fields of live streaming. For example, in a live streaming room, an anchor can explain some products to viewers in the live streaming room, and these viewers can place orders for these products in the live streaming room.

However, since products displayed in the live streaming room are usually from a single source, it is easy to cause these products to fail to meet the needs of users, which easily leads to a poor user experience.

SUMMARY

In order to solve the above technical problem, the present application provides an object display method and apparatus, and electronic device and computer-readable medium, capable of improving the user's experience.

In order to realize the above objective, an embodiment of the present application provides a technical solution as follows:

An embodiment of the present application provides an object display method, the method comprising:

displaying at least one object to be displayed corresponding to a video playing page in an object display area of the video playing page;

displaying an object aggregation page in response to a triggering operation on the object display area; wherein the object aggregation page is configured for displaying at least one candidate object;

a matching degree between the candidate object and a target object meets a preset matching condition; the target object is determined from the at least one object to be displayed according to description information of the at least one object to be displayed.

In one possible implementation, the object aggregation page is a platform page; similarity between the candidate object and the target object meets a preset similarity condition; the candidate object is different from each of said objects to be displayed.

In a possible embodiment, if the at least one object to be displayed comprises at least one first object, and description information of the first object comprises historical operation information of the first object, the target object is determined from the at least one first object according to the historical operation information of the at least one first object.

In one possible implementation, the target object is an object to be referenced in the at least one first object; the historical operation information of the object to be referenced indicates that a target operation triggered with respect to the object to be referenced meets a preset operation condition before the triggering operation on the object display area occurs.

In one possible implementation, the preset operation condition is that a time difference between time of occurrence of the target operation triggered with respect to the object to be referenced and time of occurrence of the triggering operation on the object display area meets a preset difference condition; the target operation includes at least one of information viewing operation, staying time on an information introduction page of the object to be referenced reaching a preset time threshold, a collecting operation, an ordering operation and a selecting operation.

In a possible implementation, the description information includes state information; if the first object does not exist in the at least one object to be displayed, the target object is determined from the at least one object to be displayed according to the state information of the at least one object to be displayed.

In a possible implementation, the target object is a second object of the at least one object to be displayed, and the state information of the second object meets a preset state condition.

In a possible implementation, the video playing page is a live video page; the preset state condition is that the state information of the second object indicates that the second object is in an explanation state at the time of occurrence of the triggering operation on the object display area.

In one possible implementation, the displaying an object aggregation page, comprises: displaying the object aggregation page in the object display area; wherein the object display area has a size smaller than a size of the video playing page;

after the displaying the object aggregation page in the object display area, the method further comprising:

displaying the object aggregation page in full screen in response to a first operation triggered with respect to the object aggregation page;

or, displaying at least one object to be displayed corresponding to the video playing page in the object display area in response to a second operation triggered with respect to the object aggregation page;

or, displaying at least one object to be displayed corresponding to the video playing page in the object display area in response to a third operation triggered with respect to an area outside the object display area in the video playing page.

In one possible implementation, after the displaying the object aggregation page in full screen, the method further comprises:

displaying the video playing page in response to a fourth operation triggered with respect to the object aggregation page; at least one object to be displayed corresponding to the video playing page is displayed in the object display area of the video playing page.

In one possible implementation, the object display area displays a control to be used; the displaying the object aggregation page in response to a triggering operation on the object display area comprising:

displaying the object aggregation page in response to a triggering operation on the control to be used.

In one possible implementation, guidance content is displayed on the control to be used; the guidance content is determined according to category description information of the target object;

the method further comprising:

if the target object is updated, updating the guidance content displayed on the control to be used.

In one possible implementation, the at least one object to be displayed is displayed in the object display area according to a preset order;

the displaying the object aggregation page in response to a triggering operation on the object display area comprising:

if an object to be displayed at the last position in the preset order is displayed in the object display area, displaying the object aggregation page in response to a preset operation triggered with respect to the object display area.

An embodiment of the present application further provides an object display apparatus, comprising:

a first displaying unit configured for displaying at least one object to be displayed corresponding to a video playing page in an object display area of the video playing page;

a second displaying unit configured for displaying an object aggregation page in response to a triggering operation on the object display area; wherein the object aggregation page is configured for displaying at least one candidate object; a matching degree between the candidate object and a target object meets a preset matching condition; the target object is determined from the at least one object to be displayed according to description information of the at least one object to be displayed.

An embodiment of the present application further provides an electronic device comprising: a processor and a memory;

wherein the memory is configured for storing an instruction or a computer program; and the processor is configured for executing the instruction or computer program in the memory, to cause the electronic device to implement the object display method provided by an embodiment of the present application.

An embodiment of the present application further provides a computer-readable medium, in which an instruction or computer program is stored, which instruction or computer program, when run on a device, causes the device to implement the object display method provided by an embodiment of the present application.

An embodiment of the present application further provides a computer program product comprising a computer program carried on a non-transient computer-readable medium, the computer program including program code for implementing the object display method provided by an embodiment of the present application.

As compared to the related art, the embodiment of the present invention has at least advantages as the following:

In the technical scheme provided by the embodiment of the present application, for a video playing page being displayed (for example, a live video page), when at least one object to be displayed corresponding to the video playing page (for example, a product to be displayed and introduced in a live room) is displayed in the object display area of the video playing page, a viewer of the video playing page can not only get to know associated contents of the object to be displayed from the object display area, he can also access an object aggregation page by a triggering operation on the object display area (for example, clicking on a top portal control, clicking on a bottom portal control, etc.), so that the viewer can browse some candidate objects that match a target object (for example, a product clicked by the user last or a product in an explanation state, etc.) among objects to be displayed from the object aggregation page such that the viewer can not only select his favorite object from at least one object to be displayed corresponding to the video playing page, but also select his favorite object from the object aggregation page, which can effectively expand an object selection range of the viewer, thus being beneficial to better meeting the viewer's object selection requirements and further improving the user experience of the viewer.

It can be seen that the above object aggregation page is opened by triggering a simple operation (for example, clicking the top portal control, clicking the bottom portal control, etc.) for the object display area in the video playing page, so that the opening operation of the object aggregation page is very simple, so that the viewer of the video playing page can obtain objects other than the at least one object to be displayed corresponding to the video playing page through this simple operation. In this way, complexity of operation of viewing these other objects by the viewer can be effectively reduced, so that adverse reactions caused by high operational complexity can be effectively avoided, and the user experience can be improved.

BRIEF DESCRIPTION OF THE DRAWINGS

In order to more clearly describe the embodiments of the present application or the technical solutions in the related art, drawings used in the description of the embodiments or the related art will be briefly described below. Obviously, the drawings in the following description are only some embodiments recited in the present application. Those skilled in the art can obtain further drawings according to these drawings without any creative effort.

DETAILED DESCRIPTION OF PREFERRED EMBODIMENTS

Figure 1:
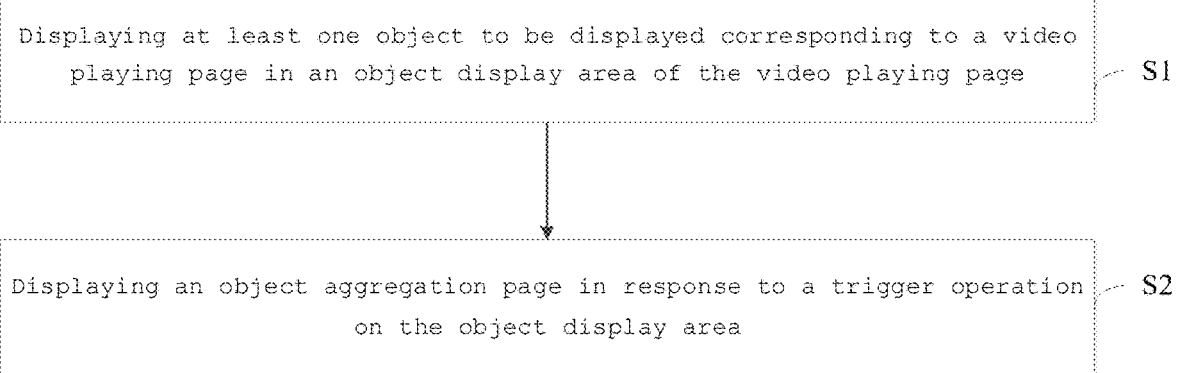
FIG. 1 is a flowchart of an object display method provided by an embodiment of the present application.

In the research on live streaming rooms, the inventor found that in a live streaming room, a viewer in the live streaming room can usually adopt the following two products ordering schemes: (1) the viewer can directly place an order for a product being explained by an live streamer on a live streaming page; (2) the viewer can actively open a list of the in-cart-products (also known as a small yellow cart list), so that the viewer can browse some in-cart-products on his own initiative from the list of the in-cart-products, and select a desired product from these in-cart-products to place an order. Wherein the in-cart-products can usually refer to products that will be explained by the live streamer in the live streaming room.

The inventor also found that, since the live streaming room can only display products belonging to the live streaming room, the source of the products displayed in the live streaming room is usually relatively unique, so that the viewer of the live streaming room can only see the products belonging to the live streaming room in the live streaming room, and then, when the viewer wants to see products other than the products belonging to the live streaming room (for example, products similar to a product in the live streaming room), the viewer needs to leave the live streaming room before visiting the mall or other live streaming rooms to browse other products, which leads to complicated operation by the viewer to obtain other products, resulting in a poor user experience.

Based on the above findings, in order to solve the problem mentioned in the background portion, an embodiment of the present application provides an object display method, the method comprising: for a video playing page being displayed (for example, a live video page), when at least one object to be displayed corresponding to the video playing page (for example, a product to be displayed and introduced in a live room) is displayed in the object display area of the video playing page, a viewer of the video playing page can not only get to know associated contents of the object to be displayed from the object display area, he can also access an object aggregation page by a triggering operation on the object display area (for example, clicking on a top portal control, clicking on a bottom portal control, etc.), so that the viewer can browse some candidate objects that match a target object (for example, a product clicked by the user last or a product in an explanation state, etc.) among objects to be displayed from the object aggregation page such that the viewer can not only select his desired object from at least one object to be displayed corresponding to the video playing page, but also select his desired object from the object aggregation page, which can effectively expand an object selection range of the viewer, thus being beneficial to better meeting the viewer's object selection requirements and further improving the user experience of the viewer.

It can be seen that the above object aggregation page is opened by triggering a simple operation (for example, clicking the top portal control, clicking the bottom portal control, etc.) for the object display area in the video playing page, so that the opening operation of the object aggregation page is very simple, so that the viewer of the video playing page can obtain objects other than the at least one object to be displayed corresponding to the video playing page through this simple operation. In this way, complexity of operation of viewing these other objects by the viewer can be effectively reduced, so that adverse reactions caused by high operational complexity can be effectively avoided, and the user experience can be improved.

Besides, the embodiment of the present application does not limit the execution subject of the above-mentioned object display method. For example, the object display method provided by the embodiment of the present application can be executed by electronic devices, including but not limited to smart phones, tablet computers, notebook computers, personal digital assistant (PDA) and the like.

It can be understood that before using the technical solutions disclosed in various embodiments of the present disclosure, users should be informed of the types, scope of use, use scenes, etc. of personal information involved in the present disclosure in an appropriate way according to relevant laws and regulations and be authorized by users. For example, in response to receiving a user's active request, prompt information is sent to the user to clearly remind the user that the operation requested by the user will require obtaining and using the user's personal information. Therefore, the user can independently choose whether to provide personal information to software or hardware such as electronic devices, applications, servers or storage media that perform the operation of the technical solution of the present disclosure according to the prompt information. As an optional but non-limiting implementation, in response to receiving the user's active request, the way to send the prompt information to the user can be, for example, a pop-up window, in which the prompt information can be presented in text. In addition, the pop-up window can also carry a selection control for the user to choose "agree" or "disagree" to provide personal information to the electronic device. It can be understood that the above process of notifying and obtaining user authorization is only schematic, and does not limit the implementation of the present disclosure. Other ways to meet relevant laws and regulations can also be applied to the implementation of the present disclosure.

In order to allow a person skilled in the art to better understand the solution of the present application, with reference to the figures of the embodiments of the present application, a clear and complete description is given below for the technical solutions of the embodiments of the present application. Obviously, the embodiments described below are only part of the embodiments, rather than all of the embodiments. All other embodiments that can be obtained by a person skilled in the art based on the embodiments of the present application without any creative effort are included in the protection scope of the present application.

In order to better understand the technical solution of the present application, at least one possible implementation of the object display method provided by the present application will be described below with reference to FIG. 1. Wherein FIG. 1 is a flowchart of an object display method provided by an embodiment of the present application.

As shown in FIG. 1, an object display method provided by an embodiment of the present application, comprises steps S1-S2.

S1: displaying at least one object to be displayed corresponding to a video playing page in an object display area of the video playing page.

Wherein the video playing page refers to a playing area of video data. That is, a piece of video data can occupy all areas on the video playing page for display.

Further, the video playing page is not limited by the embodiment of the application, for example, it can be a live video page (for example, a live video page 200 shown in FIG. 2) or a short video page.

Figure 2:
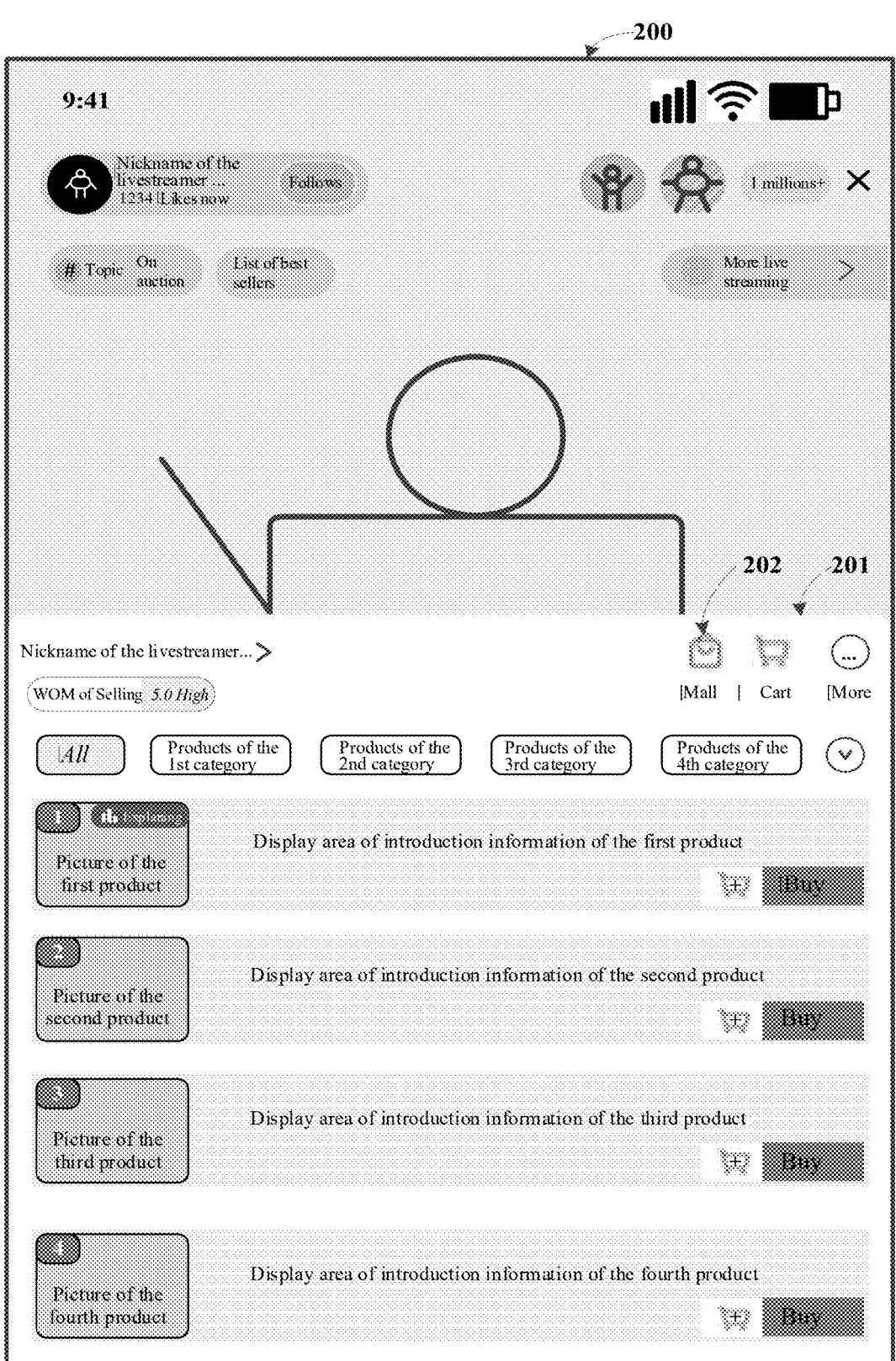
FIG. 2 is a schematic diagram of a video playing page provided by an embodiment of the present application.

Besides, an object display area (for example, the area 201 shown in FIG. 2) can be displayed on the video playing page, and at least one object to be displayed corresponding to the video playing page (for example, the first product, the second product, . . . , etc. shown in FIG. 2) can be displayed in the object display area. Wherein the object display area has a size smaller than a size of the video playing page.

Wherein the object to be displayed can be understood as the object that needs to be introduced on the above video playing page. For example, if the video playing page is a live video page, the object to be displayed can be understood as a product that needs to be displayed and introduced in the live room corresponding to the live video page. For another example, if the video playing page is a short video page, the object to be displayed can be understood as a product displayed and introduced in the short video corresponding to the short video page (such as a product corresponding to a purchase link added in the short video).

For example, in a live streaming scenario, the above-mentioned object to be displayed may refer to a cart object in a live streaming room, such as an in-cart-product. Generally speaking, in-cart-products can include at least two parts of products, a first part can be a product being explained (for example, the first product shown in FIG. 2) and a second part can be a product not being explained (for example, the second product shown in FIG. 2). For the above two parts of products, a user can add an in-cart-product to his shopping cart to achieve more convenient shopping.

It should be noted that the embodiment of the present application is not limited to the above products, for example, it can be a purchasable product (for example, a cup, etc.) or an acceptable service (for example, a haircut, etc.).

Figure 3:
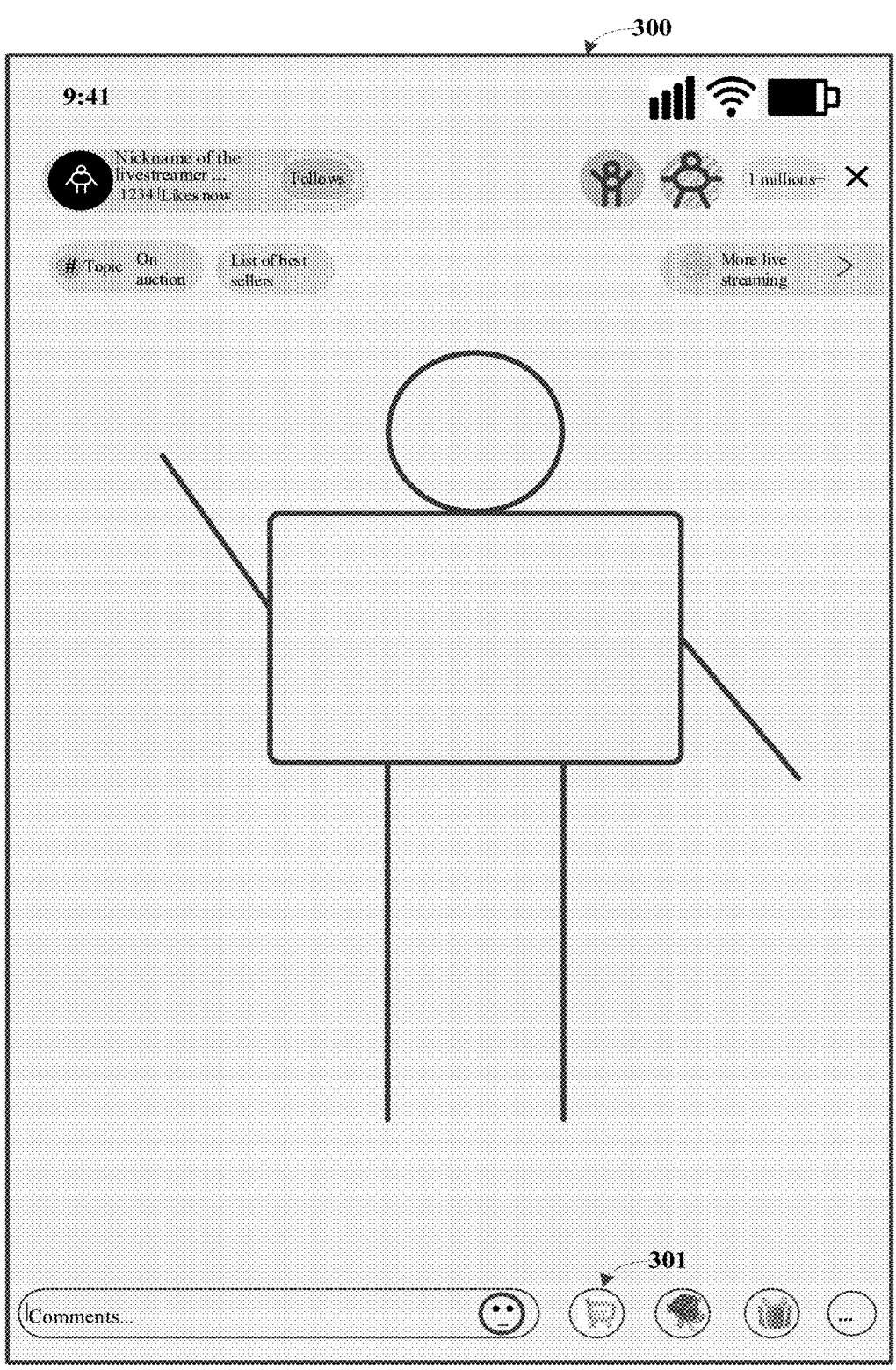
FIG. 3 is a schematic diagram of another video playing page provided by an embodiment of the present application.

It should also be noted that this embodiment of the application does not limit the viewing mode of the cart objects mentioned above. For example, when a viewer in the live streaming room is watching the page 300 shown in FIG. 3, the viewer can open the list of the in-cart-objects shown in FIG. 2 (for example, the list of the in-cart-products displayed in the area 201 shown in FIG. 2) by clicking the control of Little Yellow Cart 301, so that the viewer can view all cart objects in the live streaming room from the list of the in-cart-objects.

It should also be noted that the embodiment of the present application does not limit the display mode of the above-mentioned "at least one object to be displayed" in the object display area, for example, these objects to be displayed can be displayed in a list mode (for example, the list mode displayed in the area 201 shown in FIG. 2). Besides, the embodiment of the application is also not limited to contents displayed for these objects to be displayed in the object display area, for example, it can at least include: pictures of these objects to be displayed (for example, "a picture of the first product" shown in FIG. 2), introduction information (for example, "introduction information of the first product" shown in FIG. 2), status information (for example, "in explanation" shown in FIG. 2), triggering operations that a user is allowed to perform (for example, adding to a shopping cart, rush buy, etc.) and so on.

Further, the video playing page can be configured to explain at least one object to be displayed corresponding to the video playing page, so that the viewer of the video playing page can obtain the contents (such as price, discount, quality, comments, etc.) related to these objects to be displayed described through video explanation from the video playing page.

Based on the related content of the above S1, it can be known that for a video playing page being displayed (for example, the live video page 200), the video playing page can not only play video data for explaining at least one object to be displayed corresponding to the video playing page, but also display the at least one object to be displayed in the object display area of the video playing page, so that the viewer of the video playing page can not only get to know these objects to be displayed by watching the video data, but also get to know these objects to be displayed by browsing them in the object display area.

Figure 4:
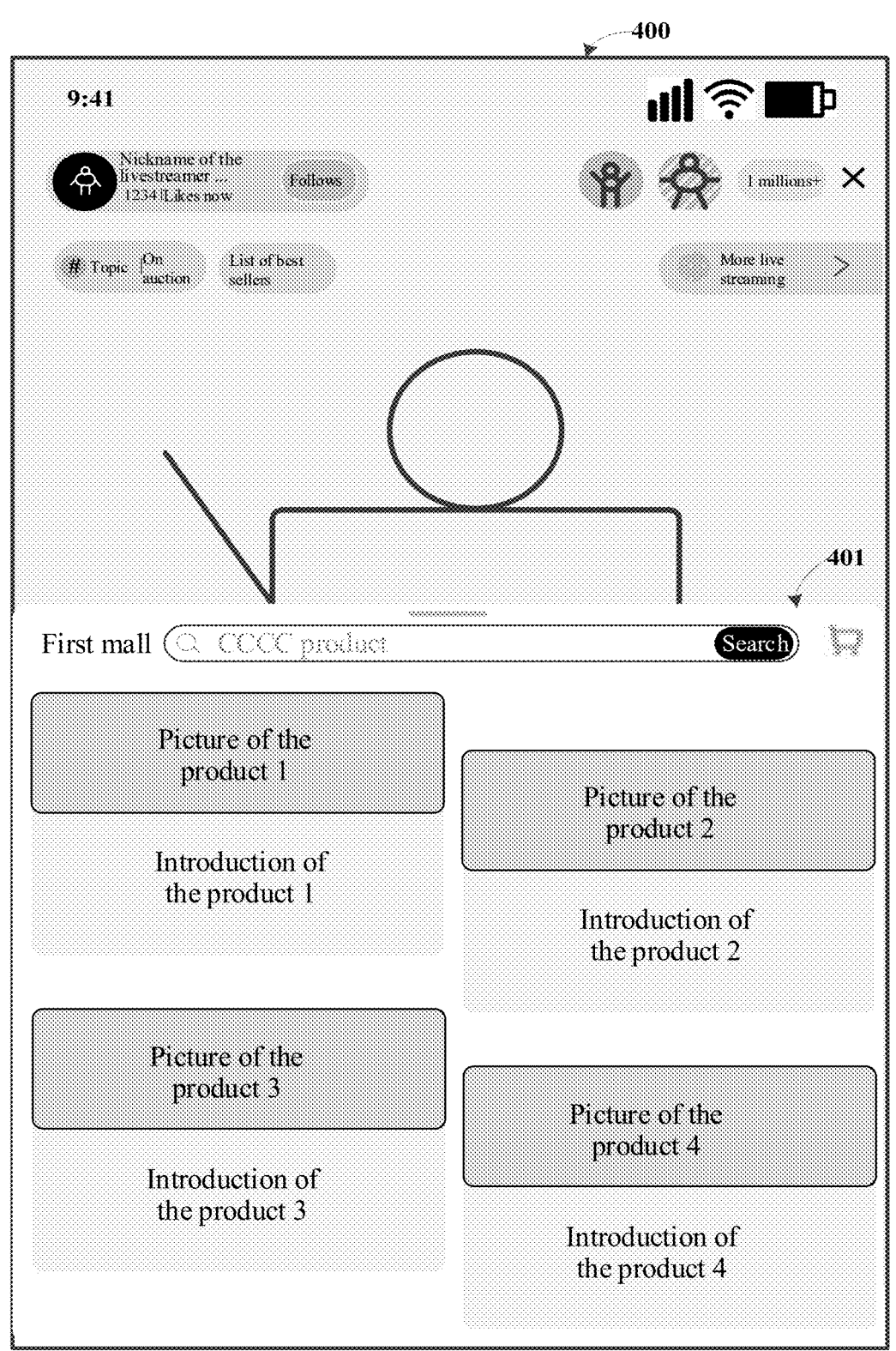
FIG. 4 is a schematic diagram of an object aggregation page provided by an embodiment of the present application.
Figure 5:
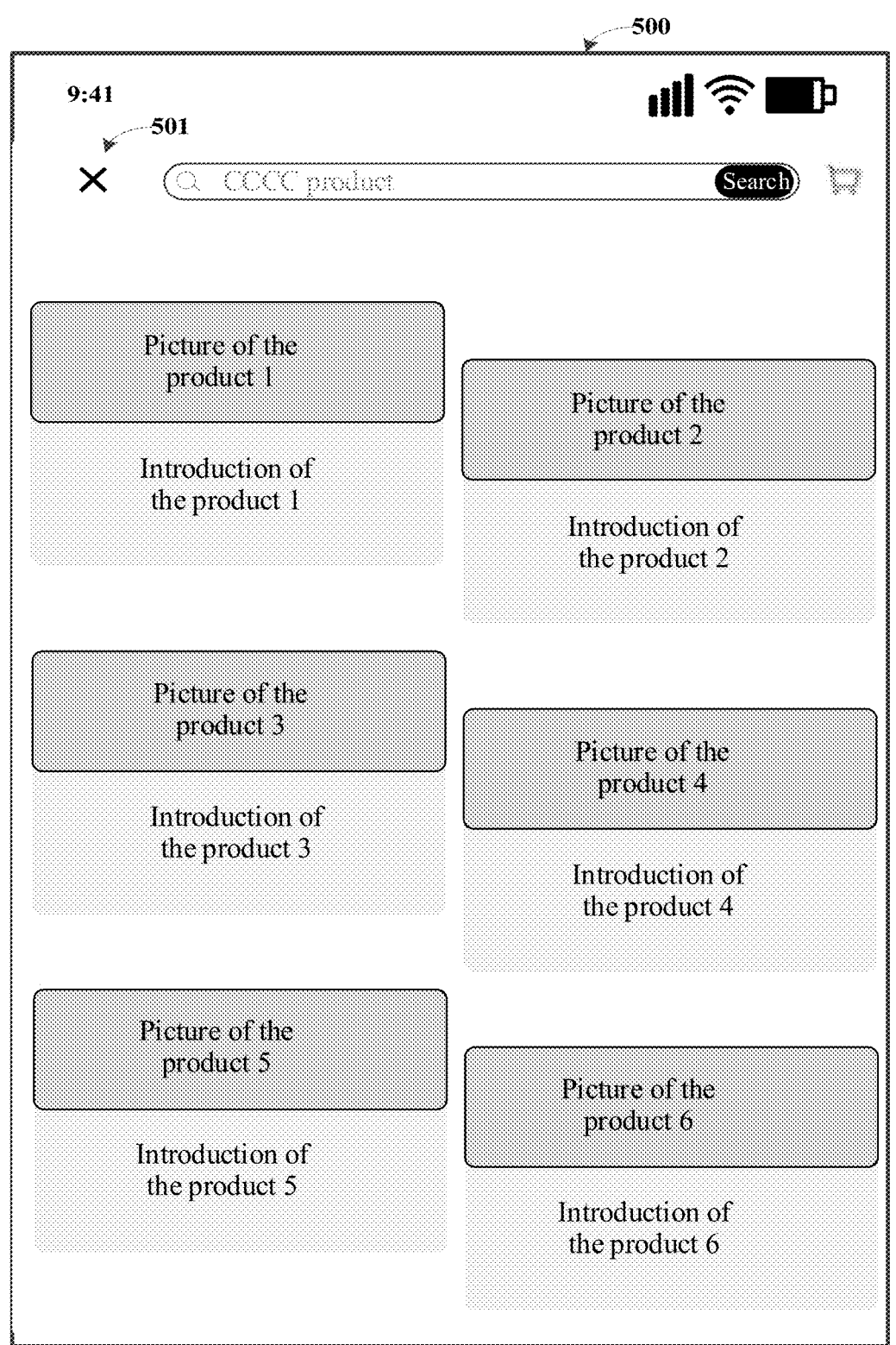
FIG. 5 is a schematic diagram of another object aggregation page provided by an embodiment of the present application.

S2: displaying an object aggregation page in response to a triggering operation on the object display area.

Wherein the object aggregation page is configured for displaying at least one candidate object. For example, when the above video playing page is the page 200 shown in FIG. 2, and the above object display area is the area 201 shown in FIG. 2, the object aggregation page may be the page 401 displayed in the page 400 shown in FIG. 4 in a half-screen display mode, or the page 500 displayed in a full-screen display mode in FIG. 5, and these candidate objects displayed on the object aggregation page may include product 1, product 2, . . . as shown in FIG. 4 or 5.

Besides, the embodiment of the present application is not limited to the above-mentioned object aggregation page, for example, it may be a platform page. Here, the platform page refers to a page in a shopping platform that is used to aggregate multiple objects (e.g., multiple products) for display. For example, the platform page can be the mall homepage 401 of the first mall shown in FIG. 4 or the mall homepage 500 of the first mall shown in FIG. 5.

Besides, a matching degree between the candidate object and the target object in at least one object to be displayed meets a preset matching condition.

The target object is configured to indicate the object to be displayed that the viewer of the above video playing page may be interested in at least one object to be displayed corresponding to the video playing page. For example, when the video playing page is a live video page, the target object may be an object to be displayed in an explanation state on the video playing page (for example, the first product shown in FIG. 2) at the time of occurrence of the triggering operation on the object display area. For another example, the target object can also be the object to be displayed that the viewer of the video playback page operated for the last time before the triggering operation on the object display area.

Besides, the embodiment of the application does not limit the determining process of the above-mentioned target object, for example, it may comprise particularly: selecting one or more objects from the above-mentioned "at least one object to be displayed" and determining the same as the target object.

In fact, in order to better improve the accuracy of user's intention prediction, the embodiment of the application also provides another possible implementation of the determining process of the above-mentioned target object, which may comprise particularly: according to description information of the above at least one object to be displayed, determining the target object from the at least one object to be displayed. Wherein the description information is configured to describe contents related to the object to be displayed (for example, a state of the object, a user operation triggered with respect to the object, etc.).

Besides, the embodiment of the application is not limited to the above description information, for example, the description information may at least include state information. The state information is configured to describe the state of the object to be displayed (for example, in an explanation state, in a non-explanation state, in a hot sale state, in a primary promotion state, etc.). For another example, if the object to be displayed has been operated by the user, the description information of the object to be displayed may further include historical operation information, so that the historical operation information can indicate which operations were triggered by the viewer of the video playing page for the object to be displayed before occurrence of the triggering operation on the object display area (for example, opening the information introduction page of the object to be displayed, collecting the object to be displayed, adding the object to be displayed to a shopping cart, placing an order for the object to be displayed, etc.). Wherein the historical operation information is configured to describe which operations were triggered by the viewer of the video playing page for the object to be displayed before occurrence of the triggering operation on the object display area.

The embodiment of the present application is not limited to the implementation of the above step of "according to description information of the above at least one object to be displayed, determining the target object from the at least one object to be displayed". For example, in one possible implementation, when the above description information includes at least the state information, the determining process of the target object may comprise particularly steps 11-15:

Step 11: according to the description information of the above at least one object to be displayed, determining whether there is a first object that meets the preset information condition in the at least one object to be displayed.

Wherein the preset information condition is configured for screening out the object to be displayed which has been operated by the user from the above at least one object to be displayed; and the preset information condition can be preset, for example, it may comprise particularly that the description information includes at least the historical operation information.

It can be seen that for the n-th object to be displayed, if there is historical operation information in the description information of the n-th object to be displayed, it can be determined that the viewer of the video playing page has triggered at least one operation on the n-th object to be displayed before the triggering operation on the object display area occurs, so that it can be determined that the n-th object to be displayed meets the preset information condition, so that it can be determined that the n-th object to be displayed is the first object. N is a positive integer, n≤N, n is a positive integer, and n represents the number of objects in the above "at least one object to be displayed".

The first object is configured to represent the object to be displayed that has been operated by the viewer of the video playing page before the triggering operation on the object display area occurs. It can be seen that for the description information of the first object, the description information of the first object includes not only the state information of the first object, but also the historical operation information of the first object, so that the description information of the first object can not only show the state of the first object on the video playing page (for example, whether it is being explained or not), but also show what operations the viewer of the video playing page has performed on the first object.

Based on the related content of the above step 11, for the above at least one object to be displayed, all the objects to be displayed that have been operated by the viewer of the video playing page can be screened out as the first objects, so that these first objects can reflect the viewer's interest to some extent.

Step 12: if it is determined that there is at least one first object in the above at least one object to be displayed, determining the target object from the at least one first object according to the historical operation information of the at least one first object.

The embodiment of the present application is not limited to the implementation of the step 12, for example, it may comprise particularly: after acquiring the q-th first object, if it is determined that the historical operation information of the q-th first object indicates that the viewer of the above video playing page has triggered a preset interest characterization operation on the q-th first object, it can be determined that the viewer may be interested in the q-th first object, so that the q-th first object can be determined as the target object, so as to be able to infer the interest focus of the viewer based on the target object, subsequently. Wherein the historical operation information of the q-th first object is configured to describe which operations were triggered by the viewer of the video playing page for the q-th first object before occurrence of the triggering operation on the object display area. The interest characterization operation refers to an operation that a user may perform when he is interested in an object; and the embodiment of the application does not limit the interest characterization operation, for example, the interest characterization operation is similar to the below "target operation". Q is a positive integer, q≤Q, q is a positive integer, and q represents the number of first objects.

In fact, a user's interest may change with his browsing process for some objects, so that, in order to better improve the prediction accuracy of interest, the embodiment of the present application also provides another possible implementation of the step 12, which may include particularly steps 121-122:

Step 121: according to historical operation information of at least one first object, searching an object to be referenced from the at least one first object, so that the historical operation information of the object to be referenced indicates that the target operation triggered with respect to the object to be referenced meets a preset operation condition before the triggering operation on the object display area occurs.

Wherein the target operation refers to an operation that a user may perform when he is interested in an object; and the embodiment of the application does not limit the target operation, for example, it may include particularly at least one of information viewing operation, staying time on an information introduction page of the object to be referenced reaching a preset time threshold, a collecting operation, an ordering operation and a selecting operation.

The above-mentioned "information viewing operation" refers to an operation that a user can trigger when he wants to view introduction details of an object. For example, when the above "video playing page" is the page 200 shown in FIG. 2, if the viewer of the video playing page wants to see the introduction details of the first product, the viewer can trigger a click operation in the display area of the first product in FIG. 2 (that is, the area for displaying the picture of the first product and introduction information), so that the information introduction page of the first product can be presented to the viewer, so that the viewer can view the introduction details of the first product from the information introduction page.

The above-mentioned "information introduction page" is configured to show the related contents (e.g. picture, name, price, promotion activities, user comments, product parameters, etc.) of an object (e.g. the first product shown in FIG. 2). Besides, for the information introduction page, if a user stays on the information introduction page for a longer time, it can indicate that the user is more likely to be interested in the object introduced in the information introduction page (for example, the first product shown in FIG. 2).

The above-mentioned "preset time threshold" can be set in advance, especially according to the actual application scenario.

The above-mentioned "collecting operation" is configured to collect an object so that the user can find the object from the favorites in the future. Besides, the embodiment of the application is not limited to this collecting operation, for example, it can be any existing or future collecting operation.

The above-mentioned "ordering operation" is configured to generate an order for an object, so that subsequently, a provider of the object can provide the object to a demander of the object based on the order. Besides, the embodiment of the application is not limited to this ordering operation, for example, it can be any existing or future ordering operation.

The above "selecting operation" is a selection operation; and the embodiment of the present application is not limited to this selecting operation, for example, it may comprises an operation of adding into a shopping cart.

Besides, the above "preset operation condition" can be set in advance, for example, it may comprise that a time difference between the time of occurrence of the target operation triggered with respect to the object to be referenced and the time of occurrence of the triggering operation on the above object display area meets a preset difference condition. Wherein the preset difference condition can be preset, for example, when the time difference between the time of occurrence of the target operation triggered with respect to the object to be referenced and the time of occurrence of the triggering operation on the above-mentioned object display area is $D_{socre}$, and the time difference between the time of occurrence of the target operation triggered with respect to the q-th first object and the time of occurrence of the triggering operation on the above-mentioned object display area is Dq, the preset difference condition may comprise particularly a condition represented by the following formula (1):

$$D_{score} = \min(D1, D2, D3, \ldots, DQ) \qquad (1)$$

Wherein, $D_{socre}$ represents a time difference between the time of occurrence of the target operation triggered with respect to the object to be referenced and the time of occurrence of the triggering operation on the object display area above; Dq represents a time difference between the time of occurrence of the target operation triggered with respect to the q-th first object and the time of occurrence of the triggering operation on the above object display area; q≤Q, q is a positive integer, and Q represents the number of first objects; Min ( ) represents a function that takes the minimum value, so that min (D1, D2, D3, . . . , DQ) represents that the minimum value is determined from the q differences of D1, D2, D3, . . . , and DQ, so that the first object corresponding to the minimum value can be determined as the object to be referenced, subsequently.

It can be seen that for the above "at least one first object", the historical operation information of these first objects can be configured to analyze, for which first objects, the viewer of the video playing page has triggered the target operation before the triggering operation on the above object display area occurred; then, an object to be referenced is screened out from the first objects for which the target operation has been triggered, so as to minimize the time difference between the time of occurrence of the target operation triggered with respect to the object to be referenced and the time of occurrence of the triggering operation on the above object display area (that is, the time of occurrence of the target operation triggered by the viewer for the object to be referenced is the latest as of the time of occurrence of the triggering operation on the above object display area), so that the object to be referenced can reflect the interest of the viewer to some extent.

Step 122: determining the object to be referenced as the target object.

In the embodiment of the present application, after selecting the object to be referenced from the above "at least one first object", the object to be referenced can be determined as the target object, so that the target object can reflect the interest of the viewer of the video playing page as much as possible.

Based on the related content of the above step 12, it can be known that for the above "at least one object to be displayed", when it is determined that there is a first object among these objects to be displayed that meets the preset information condition, it can be determined that the viewer of the video playing page triggered the target operation on one or more objects to be displayed in the object display area before the triggering operation on the above object display area occurs, so that it can be inferred that the viewer is likely to trigger the target operation on these objects to be displayed (that is, these first objects).

Step 13: if it is determined that there is no first object existing in the at least one object to be displayed, determining the target object from the at least one object to be displayed according to the state information of the at least one object to be displayed.

In the embodiment of the present application, for the above "at least one object to be displayed", when it is determined that there is no first object existing in these objects to be displayed that meets the preset information condition, it can be determined that the viewer of the video playing page has not triggered the target operation on these objects to be displayed in the object display area by the time of the triggering operation on the above object display area, whereby it can be inferred that the object that the viewer is interested in may be the object to be displayed in the preset target state at the time of occurrence of the triggering operation on the above object display area.

The above-mentioned "target state" refers to a preset state that needs to be referenced when determining the target object; and the embodiment of the present application does not limit the target state. For example, when the above video playing page is a live video page, the target state may comprise particularly: the object to be displayed that the video playing page is explaining (that is, the object to be displayed in the explanation state).

The object to be displayed being explained can be understood as that the display state of the object to be displayed is "in explanation", that is, the object to be displayed being explained is the object to be displayed that is being displayed and introduced in the live streaming room corresponding to the above video playing page.

For another example, when the video playing page is a live video page, the target state may also comprise that a heat value of the object to be displayed reaches a preset heat threshold (that is, the object to be displayed in a hot sale state). Wherein the heat value is used to indicate an attention degree of the object to be displayed; and the embodiment of the application does not limit the determining process of the heat value, for example, it can be determined according to the collecting amount, experiencing amount (for example, a purchase amount for a particular product), forwarding amount and the like of the object to be displayed.

For a further example, when the video playing page is a live video page, the target state may further comprise that recommendation characterization data of the object to be displayed reaches a preset primary promotion condition (that is, the object to be displayed in the primary promotion state). Wherein the recommendation characterization data is configured to describe a level of recommendation for the object to be displayed; and the embodiment of the present application does not limit a determining process of the recommendation characterization data, for example, it can be based on a duration of explanation by an live streamer for the object to be displayed, the number of times of explanation by the live streamer for the object to be displayed, and tag information preset by the live streamer for the object to be displayed (for example, a character string of "item on primary promotion"). Besides, the preset primary promotion condition can be set in advance (for example, it may comprise that this object to be displayed is marked as an item on primary promotion, etc.)

Based on the related content of the above step 13, when it is determined that there is no first object in the above "at least one object to be displayed", a second object meeting the preset state condition can be determined from these objects to be displayed according to the state information of these objects, so that the state information of the second object indicates that the second object is in the target state (for example, when the above video playing page is a live video page, the state information of the second object indicates that the second object is in an explanation state), then, the second object is determined as the target object.

Based on the related content of the above-mentioned target object, it can be known that for a video playing page being displayed (for example, live video page 200), if the viewer of the video playing page triggers a particular simple operation (for example, clicking the first portal control 202 shown in FIG. 2, clicking the second portal control 601 in the page 600 shown in FIG. 6, or, continuing to slide upward the object display area in the page 600 shown in FIG. 7), the target object (for example, the object to be displayed that the viewer clicked for the last time, or the object to be displayed in the explanation state, etc.) can be determined from the at least one object to be displayed corresponding to the video playing page, so that the target object can reflect the viewer's interest to a some extent; then, matching the target object with a large number of objects recorded in the object library corresponding to the video playing page to obtain a matching result, so that the matching result indicates that a matching degree between some candidate objects in the object library and the target object meets the preset matching condition, so that these candidate objects can be aggregated to obtain an object aggregation page; finally, the object aggregation page is displayed to the viewer, so that the viewer can continue to browse some other objects matching the target object from the object aggregation page. Wherein the object library refers to a database for storing a large number of objects corresponding to the video playing page.

The preset matching condition can be preset according to the application scenario. For example, the preset matching condition may comprise particularly that a similarity between a candidate object and the above target object meets a preset similarity condition, and that the candidate object is different from each object to be displayed in the above "at least one object to be displayed". That is, for each candidate object displayed in the above object aggregation page, the candidate object can meet the following condition: the candidate object is similar to the target object, but the candidate object is not only different from the target object, but also different from objects to be displayed other than the target object in the at least one object to be displayed corresponding to the above video playing page. In order to facilitate understanding, further description is made below in conjunction with examples.

As an example, when the above video playing page is a live video page of a first live streaming room (for example, page 200 shown in FIG. 2), the above "at least one object to be displayed" includes all the products that need to be displayed and introduced in the live streaming room (for example, the first product shown in FIG. 2, the second product, . . . ), and the above target object is a target product in the first live streaming room (for example, the first product in the explanation state shown in FIG. 2. Moreover, when the above object aggregation page is a shopping mall homepage of a first shopping mall, candidate objects displayed on the shopping mall homepage (for example, product 1, product 2, . . . shown in FIG. 6) may be similar products obtained by weighted recommendation of the target product by the pointer, but these candidate objects are not related products of the first live streaming room (for example, products to be displayed and introduced in the live streaming room or showcase products) so that these candidate objects can show some other products similar to the target product but not belonging to the first live streaming room, so that it is helpful to enable the viewer to continue to browse some other products similar to the target product but not belonging to the first live streaming room, on the premise of not leaving the first live streaming room, thus contributing to improving the user experience of the viewer.

It should be noted that the above-mentioned "showcase products" refer to products displayed in the showcase of a live streaming room for a viewer of the live streaming room to buy at any time (for example, they can be purchased during the live streaming or during the non-live broadcasting); and the embodiment of the application does not limit an association between the showcase products and the above-mentioned "products to be displayed and introduced in the live streaming room", for example, there may or may not be any intersection between them.

Besides, the embodiment of the present application is not limited to the embodiment of "a triggering operation on the object display area" in the above S2, and for the convenience of understanding, further description is made below in conjunction with two possible implementations of S2.

In the first possible implementation, when a control to be used (for example, first portal control 202 shown in FIG. 2 or second portal control 601 shown in FIG. 6) is displayed in the above object display area, S2 may particularly comprise: display an object aggregation page in response to a triggering operation on the control to be used. Wherein the control to be used is configured for representing a portal of the object aggregation page.

Figure 6:
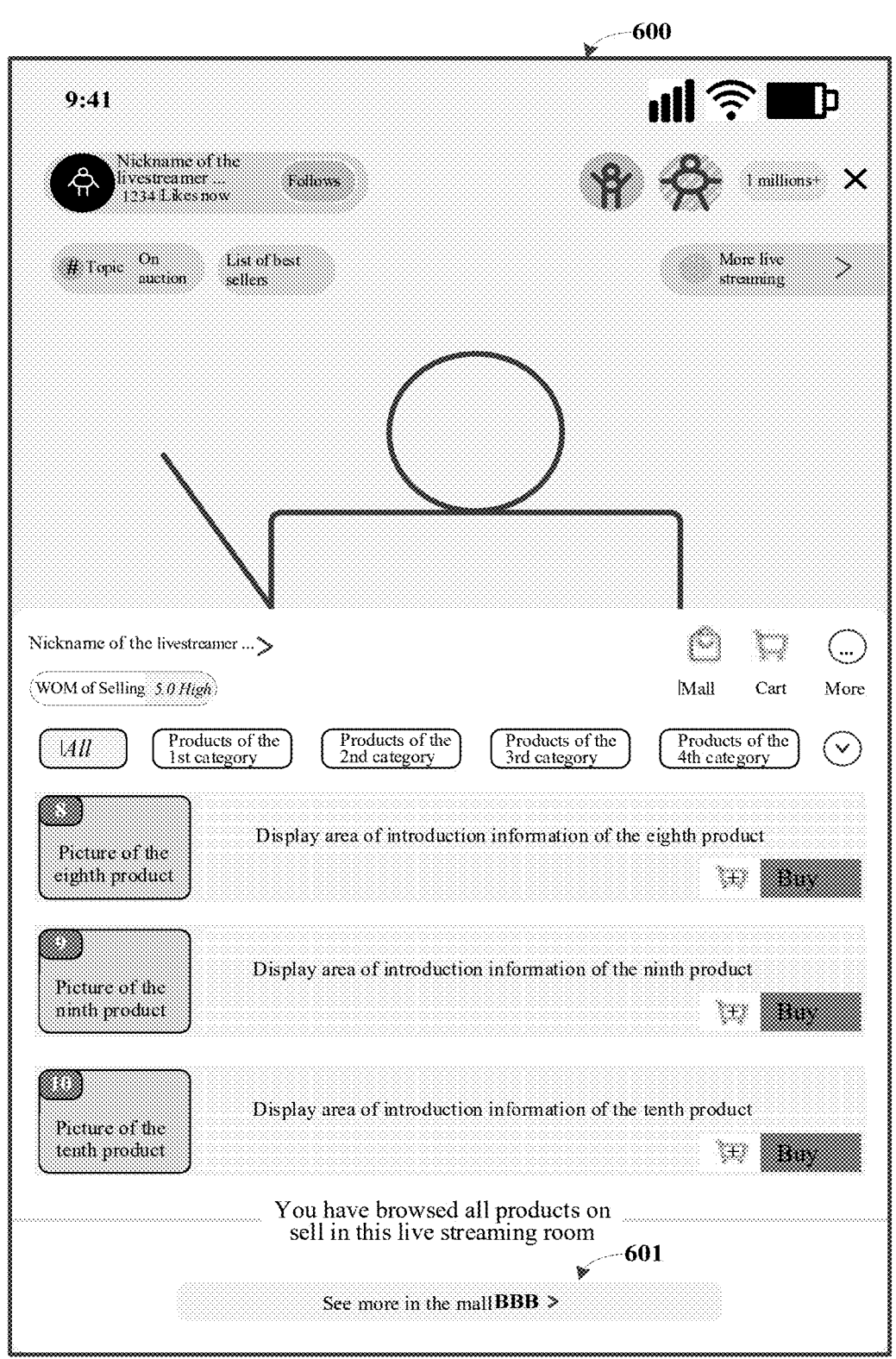
FIG. 6 is a schematic diagram of a further video playing page provided by an embodiment of the present application.

Besides, the embodiment of the application does not limit the control to be used, for example, the control to be used may be the first portal control 202 (also called top portal control) located at a top position in the above object display area as shown in FIG. 2. For another example, when the at least one object to be displayed corresponding to the above video playing page is vertically displayed according to a preset first order, the control to be used can be the second portal control 601 (also called as bottom portal control) located at a bottom position of the object display area as shown in FIG. 6. For a further example, when the at least one object to be displayed corresponding to the video playing page is horizontally displayed according to a preset second order, the control to be used can be a right portal control located at a right edge position in the object display area.

Besides, the embodiment of the present application does not limit a display mode of the control to be used, for example, it can be displayed in the form of a preset icon (for example, mall icon used by the first portal control 202 shown in FIG. 2). For another example, in order to better improve the user experience, the control to be used can be displayed with guidance content (for example, guidance content "BBB" shown in FIG. 6), so that the viewer of the video playing page can get to know from the guidance content what kind of objects (for example, spring coats, etc.) he can continue browsing by clicking the control to be used.

In addition, in order to better improve the user experience, the above-mentioned guidance content can be determined according to the above-mentioned category description information of the target object; and the embodiment of the present application does not limit a determining process of the guidance content, for example, the product category of the target object can be directly determined as the guidance content. Wherein the category description information is configured to indicate a category to which the target object belongs; and the embodiment of the present application does not limit the category description information, for example, it can be a sub-category information of the product page of the target object.

In fact, since the above-mentioned target object is not static, in order to better improve the user experience, the embodiment of the present application also provides another possible implementation of the control to be used, which may comprise particularly: if the target object is updated, updating guidance content displayed on the control to be used, so that the guidance content displayed by the control to be used can always be consistent with category description information of the target object.

It can be seen that, for the control to be used displayed in the above object display area, if the control to be used is displayed with guidance content, the guidance content can be updated with the update of the above target object. That is, since the target object may change with the user's operation or the playing process of video data in the video playing page, the guidance content displayed on the control to be used can also change with the change of the target object, so that the guidance content can show as accurately as possible what kind of object the viewer of the video playing page may be interested in.

It should be noted that the embodiment of the present application does not limit the updating mode of the above "guidance content", for example, it can be implemented by using a preset dynamic effect (for example, dynamic effects such as text fading out and appearing, etc.).

It should also be noted that the embodiment of the present application does not limit the above embodiment of "a triggering operation on the control to be used", for example, it may comprise a click operation.

Based on the related content of the above control to be used, it can be known that in some application scenarios, for a video playing page being displayed (for example, live video page 200 or live video page 600), one or more controls (for example, first portal control 202 shown in FIG. 2 or second portal control 601 shown in FIG. 6) can be deployed in the object display area of the video playing page, so that subsequently, the viewer of the video playing page can click on these controls.

In the second possible embodiment, when the above "at least one object to be displayed" is displayed in the above object display area according to a preset order, S2 may particularly comprise: if an object to be displayed at the last position in the preset order (for example, the tenth product shown in FIG. 7) is displayed in the object display area, displaying an object aggregation page in response to a preset operation triggered with respect to the object display area. Wherein the preset operation refers to an operation that needs to be triggered to express an intention of continuing to browse other objects downward; and the embodiment of the present application does not limit the implementation of the preset operation, for example, it may comprise particularly an operation of sliding in a direction indicated by a dotted arrow shown in FIG. 7.

Figure 7:
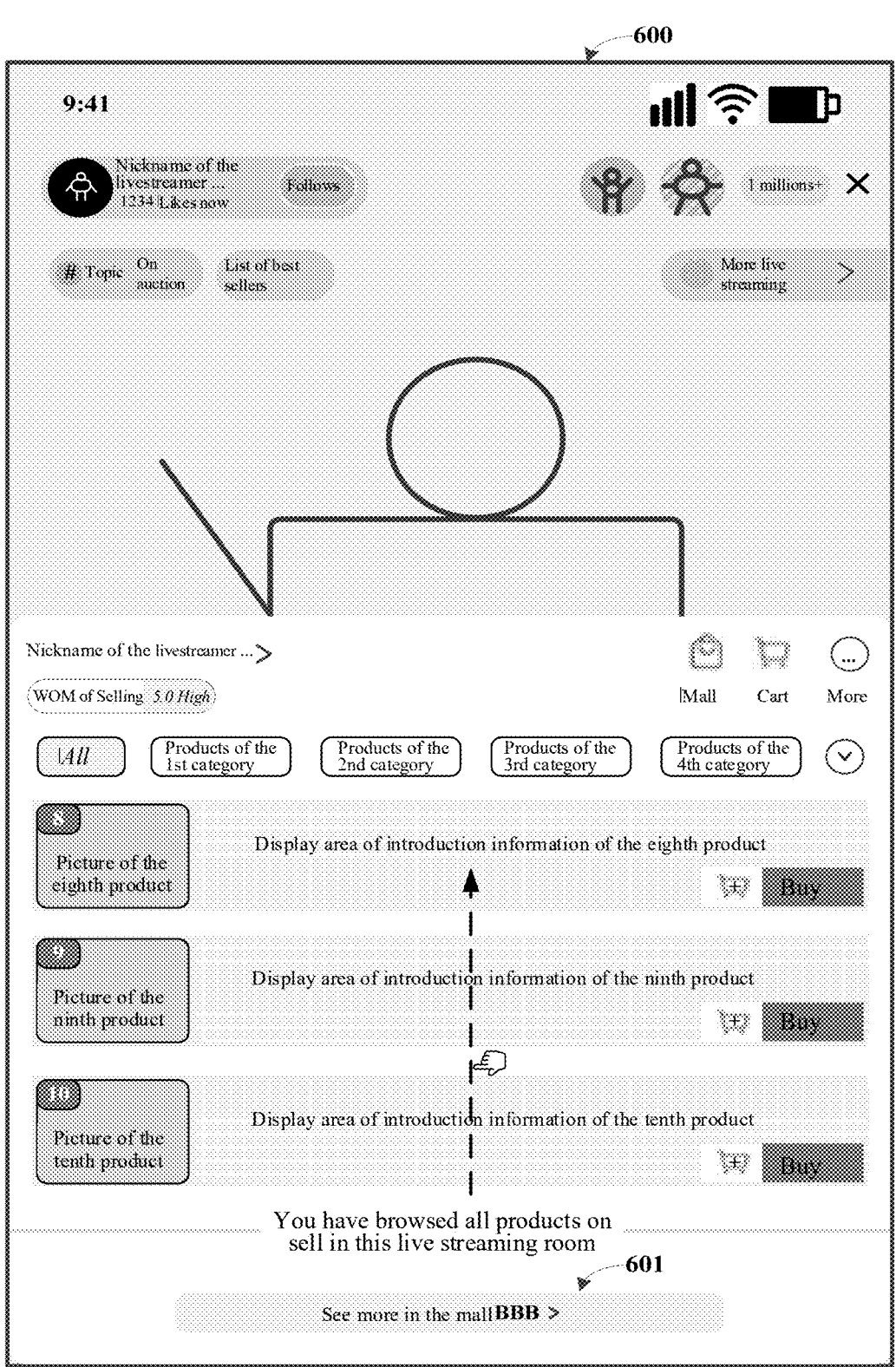
FIG. 7 is a schematic diagram of a further yet video playing page provided by an embodiment of the present application.

It can be seen that in some application scenarios, for a video playing page being displayed (for example, a live video page), a viewer of the video playing page can browse objects to be displayed in a preset order corresponding to the video playing page in the object display area of the video playing page in a sliding way, so that when the last object to be displayed (for example, the tenth product shown in FIG. 7) is displayed in the object display area, if the viewer continues to perform the operation to be triggered when browsing other objects downward (for example, sliding in a direction indicated by a dotted arrow shown in FIG. 7), it can be inferred that the viewer is likely to want to continue browsing other products, so that the object aggregation page can be directly displayed to the viewer, so that the viewer can continue browsing some other objects different from these objects to be displayed from within the object aggregation page, which can effectively meet the viewer's object browsing needs, thus contributing to improving the user experience of the viewer.

Based on the two possible implementations of the above S2, it can be seen that for a video playing page (for example, a live video page) being displayed, the viewer of the video playing page can perform a particular operation in the object display area of the video playing page (for example, clicking the first portal control 202 shown in FIG. 2, clicking the second portal control 601 shown in FIG. 6, or, continue to slide upward the object display area in the page 600 shown in FIG. 7, etc.), and enter the object aggregation page, so that the viewer can continue to browse some other objects different from the objects to be displayed from within the object aggregation page. It can be seen that since the operation triggered when the viewer accesses the object aggregation page is relatively simple, the operation complexity of viewing objects other than the at least one object to be displayed corresponding to the video playing page is relatively low, which can effectively reduce the operation complexity of viewing the other objects, thus effectively avoiding the adverse effect caused by relatively high operation complexity, and further contributing to improving the user experience.

Besides, the embodiment of the present application does not limit the display mode of the above object aggregation page, for example, it can be realized by page jumping. That is, in one possible implementation, S2 may comprise particularly: in response to a triggering operation on the object display area, jumping to an object aggregation page (for example, page 500 shown in FIG. 5).

It can be seen that in some application scenarios, for a video playing page being displayed (for example, live video page 200), if the viewer of the video playing page triggers a particular operation (for example, clicking the first portal control 202 shown in FIG. 2, clicking the second portal control 601 shown in FIG. 6, or, continuing to slide upward the object display area in the page 600 shown in FIG. 7, etc.), then, jumping from the video playing page to the object aggregation page (for example, page 500 shown in FIG. 5), so that the viewer can continue to browse some other objects that are not bound to the video playing page from within the object aggregation page.

In fact, in order to better improve the user experience, the object aggregation page can be displayed in a half-screen display mode in the above video playback page. Based on this, an embodiment of the present application also provides another possible implementation of the display mode of the object aggregation page, which may comprise particularly: displaying an object aggregation page in the object display area in response to a triggering operation on the object display area, so as to achieve the purpose of viewing at least one candidate object displayed by the object aggregation page without leaving the video playing page, thus avoiding the adverse effect caused by leaving the video playback page, and thus contributing to improving the user experience.

As can be known based on the related content of the above S1 to S2, according to the object display method provided by the embodiment of the present application, when an electronic device is displaying a video playing page (for example, a live video page), and when at least one object to be displayed corresponding to the video playing page (for example, a product to be displayed and introduced in a live room) is displayed in the object display area of the video playing page, a viewer of the video playing page can not only get to know associated contents of the object to be displayed from the object display area, he can also access an object aggregation page by a triggering operation on the object display area (for example, clicking on a top portal control, clicking on a bottom portal control, etc.), so that the viewer can browse some candidate objects that match a target object (for example, a product clicked by the user last or a product in an explanation state, etc.) among objects to be displayed from the object aggregation page such that the viewer can not only select his favorite object from at least one object to be displayed corresponding to the video playing page, but also select his favorite object from the object aggregation page, which can effectively expand an object selection range of the viewer, thus being beneficial to better meeting the viewer's object selection requirements and further improving the user experience of the viewer.

It can be seen that the above object aggregation page is opened by triggering a simple operation (for example, clicking the top portal control, clicking the bottom portal control, etc.) for the object display area in the video playing page, so that the opening operation of the object aggregation page is very simple, so that the viewer of the video playing page can obtain objects other than the at least one object to be displayed corresponding to the video playing page through this simple operation. In this way, complexity of operation of viewing these other objects by the viewer can be effectively reduced, so that adverse reactions caused by high operational complexity can be effectively avoided, and the user experience can be improved.

Besides, in some instances, when the object aggregation page is displayed in a half-screen display mode in the video playing page, the viewer of the video playing page may want to return to a display list of the "at least one object to be displayed" to continue browsing.

Based on the above need, an embodiment of the present application provides another possible implementation of the object display method. In this implementation, the object display method may comprise not only the below step 21 to step 22, but also the below step 23 or step 24. Wherein execution time of step 23 is later than that of step 22, and execution time of step 24 is later than that of step 22.

Step 21: displaying at least one object to be displayed corresponding to a video playing page in an object display area of the video playing page.

It should be noted that for the related content of step 21, one may refer to the related content of the above S1.

Step 22: displaying an object aggregation page in response to a triggering operation on the object display area.

It should be noted that for the related content of step 22, one may refer to the related content of the above S2.

Step 23: displaying at least one object to be displayed corresponding to the video playing page in the object display area in response to a second operation triggered with respect to the object aggregation page.

Wherein the second operation refers to an operation that needs to be triggered with respect to the object aggregation page when switching from the object aggregation page displayed in a half-screen display mode to the display page of the "at least one object to be displayed"; and the embodiment of the present application does not limit this second operation, for example, it can be implemented in any existing or future way that can return to a previous display page from the current display page. As another example, the second operation may comprise a sliding operation.

Step 24: displaying at least one object to be displayed corresponding to the video playing page in the object display area in response to a third operation triggered with respect to an area outside the object display area in the video playing page.

The third operation can be preset, for example, it may comprise a click operation.

Based on the related content of the above steps 21 to 24, it can be known that for a video playing page being displayed (for example, live video page 400 shown in FIG. 4), when an object aggregation page (for example, page 401 shown in FIG. 4) is displayed in the object display area of the video playing page, the viewer of the video playing page can return to the display page of the "at least one object to be displayed" in either of the following two ways. Wherein the two ways comprise particularly: ① the viewer can trigger a second operation (for example, sliding operation) for the object aggregation page in the object display area (for example, in area 401 shown in FIG. 4), so that the display page of the "at least one object to be displayed" can be re-displayed in the object display area, so that the viewer can continue browsing the "at least one object to be displayed" based on the last ending position. ② the viewer can trigger a third operation on an area outside the object display area in the video playing page (for example, area other than the area 401 in the page 400 shown in FIG. 4), so that the display page of the "at least one object to be displayed" can be re-displayed in the object display area, so that the viewer can continue browsing the "at least one object to be displayed" based on the last ending position.

Besides, in some instances, when the object aggregation page is displayed in the video playing page in a half-screen display mode, the viewer of the video playback page may want to view candidate objects displayed in the video playing page in full screen.

Based on the above need, an embodiment of the present application also provides another possible implementation of the object display method. In this implementation, the object display method may not only comprise some or all of the above steps, but also comprise step 25. Wherein execution time of step 25 is later than that of step 22.

Step 25: displaying the object aggregation page in full screen in response to a first operation triggered with respect to the object aggregation page.

Wherein the first operation refers to an operation that needs to be triggered when switching from a half-screen display mode to a full-screen display mode; and the embodiment of the present application does not limit the first operation, for example, it may comprise any existing or future operation that can be implemented by switching from a half-screen display mode to a full-screen display mode. As another example, the first operation may comprise a sliding operation.

Based on the related content of the above step 25, it can be known that for a video playing page being displayed (for example, live video page 400 shown in FIG. 4), when an object aggregation page (for example, page 401 shown in FIG. 4) is displayed in the object display area of the video playing page, the viewer of the video playing page can switch the object aggregation page from a half-screen display mode to a full-screen display mode by triggering a slide-up operation on the object aggregation page, so as to obtain the object aggregation page displayed in a full-screen display mode (for example, page 500 shown in FIG. 5), so that the viewer can better browse some candidate objects displayed in the object aggregation page.

Besides, in some instances, when the object aggregation page is displayed in a full-screen display mode, the viewer of the video playing page may want to return to a display list of the "at least one object to be displayed" to continue browsing.

Based on the above need, an embodiment of the present application also provides another possible implementation of the object display method. In this implementation, the object display method may not only comprise some or all of the above steps, but also comprise step 26. Wherein execution time of step 26 is later than that of step 25.

Step 26: after the full-screen display of the object aggregation page, displaying the video playing page in response to a fourth operation triggered with respect to the object aggregation page, so that at least one object to be displayed corresponding to the video playing page is displayed in the object display area of the video playing page, so that the purpose of returning from the object aggregation page displayed in the full-screen display mode to the display page of the "at least one object to be displayed" can be realized.

Wherein the fourth operation refers to an operation that needs to be triggered when switching from the object aggregation page displayed in full-screen display mode to the display page of the "at least one object to be displayed"; and the embodiment of the present application does not limit the fourth operation, for example, it can be implemented by clicking a close control 501 shown in FIG. 5.

Based on the related content of the above step 26, it can be known that for the object aggregation page being dis-played in full screen, the viewer of the object aggregation page can directly jump from the object aggregation page to the video playing page by triggering the fourth operation on the object aggregation page, so that the display page of the "at least one object to be displayed" can be re-displayed in the object display area of the video playing page, so that the viewer can continue browsing the "at least one object to be displayed" based on the last ending position, so that the purpose of browsing from the object aggregation page displayed in a full-screen display mode to the display page of the "at least one object to be displayed" can be realized, whereby it can facilitate satisfying the user experience.

Based on the object display method provided by the embodiment of the application, an embodiment of the present application further provides an object display apparatus, which will be described and illustrated below in conjunction with the attached drawings. Wherein for technical details of the object display apparatus provided by the embodiment of the present application, one may refer to relevant contents of the object display method.

Figure 8:
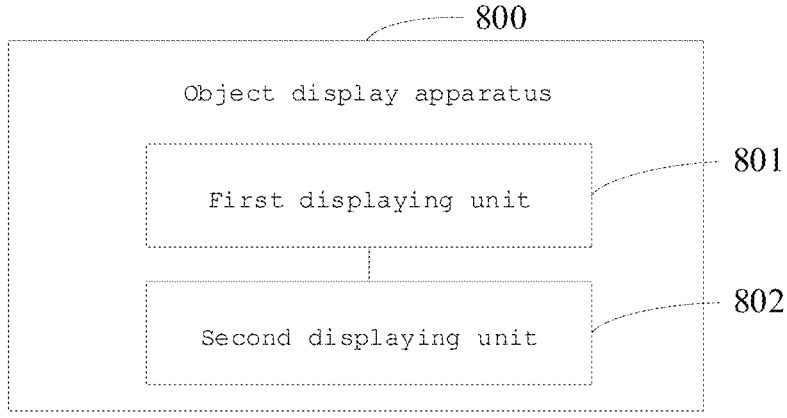
FIG. 8 is a schematic structural diagram of an object display apparatus provided by an embodiment of the present application.

Referring to FIG. 8, FIG. 8 is a schematic structural diagram of an object display apparatus provided by an embodiment of the present application.

The object display apparatus 800 provided by an embodiment of the present application, comprises:

a first displaying unit 801 configured for displaying at least one object to be displayed corresponding to a video playing page in an object display area of the video playing page;

a second displaying unit 802 configured for displaying an object aggregation page in response to a triggering operation on the object display area; wherein the object aggregation page is configured for displaying at least one candidate object; a matching degree between the candidate object and a target object meets a preset matching condition; the target object is determined from the at least one object to be displayed according to description information of the at least one object to be displayed.

In one possible implementation, the object aggregation page is a platform page;

similarity between the candidate object and the target object meets a preset similarity condition; the candidate object is different from each of said objects to be displayed.

In a possible embodiment, if the at least one object to be displayed comprises at least one first object, and description information of the first object comprises historical operation information of the first object, the target object is determined from the at least one first object according to the historical operation information of the at least one first object.

In one possible implementation, the target object is an object to be referenced in the at least one first object; the historical operation information of the object to be refer-enced indicates that a target operation triggered with respect to the object to be referenced meets a preset operation condition before the triggering operation on the object display area occurs.

In one possible implementation, the preset operation condition is that a time difference between an time of occurrence of the target operation triggered with respect to the object to be referenced and an time of occurrence of the triggering operation on the object display area meets a preset difference condition; the target operation includes at least one of information viewing operation, staying time on an information introduction page of the object to be referenced reaching a preset time threshold, a collecting operation, an ordering operation and a selecting operation.

In a possible implementation, the description information includes state information; if the first object does not exist in the at least one object to be displayed, the target object is determined from the at least one object to be displayed according to the state information of the at least one object to be displayed.

In a possible implementation, the target object is a second object of the at least one object to be displayed, and the state information of the second object meets a preset state condition.

In a possible implementation, the video playing page is a live video page; the preset state condition is that the state information of the second object indicates that the second object is in an explanation state at the time of occurrence of the triggering operation on the object display area.

In a possible embodiment, the second display unit 802 is configured particularly for: displaying the object aggregation page in the object display area in response to a triggering operation on the object display area; wherein the object display area has a size smaller than a size of the video playing page;

The object display apparatus 800 further comprises:
a third displaying unit configured for, after displaying the object aggregation page in the object display area, displaying the object aggregation page in full screen in response to a first operation triggered with respect to the object aggregation page;
or,
a fourth displaying unit configured for, after displaying the object aggregation page in the object display area, displaying at least one object to be displayed corresponding to the video playing page in the object display area in response to a second operation triggered with respect to the object aggregation page;
or,
a fifth displaying unit configured for, after displaying the object aggregation page in the object display area, displaying at least one object to be displayed corresponding to the video playing page in the object display area in response to a third operation triggered with respect to an area outside the object display area in the video playing page.

In a possible implementation, the object display apparatus 800, further comprises:
a sixth displaying unit, configured for, after displaying the object aggregation page in full screen, displaying the video playing page in response to a fourth operation triggered with respect to the object aggregation page; at least one object to be displayed corresponding to the video playing page is displayed in the object display area of the video playing page.

In one possible implementation, the object display area displays a control to be used; the second display unit 802 is configured particularly for: displaying the object aggregation page in response to a triggering operation on the control to be used.

In one possible implementation, guidance content is displayed on the control to be used; the guidance content is determined according to category description information of the target object;
The object display apparatus 800 further comprises:
a content updating unit configured for, if the target object is updated, updating the guidance content displayed on the control to be used.

In one possible implementation, the at least one object to be displayed is displayed in the object display area according to a preset order;
the second display unit 802 is configured particularly for:
if an object to be displayed at the last position in the preset order is displayed in the object display area, displaying the object aggregation page in response to a preset operation triggered with respect to the object display area.

As can be known based on the related content of the above object display apparatus 800, according to the object display apparatus 800, when displaying a video playing page, and when at least one object to be displayed corresponding to the video playing page (for example, a product to be displayed and introduced in a live room) is displayed in the object display area of the video playing page, a viewer of the video playing page can not only get to know associated contents of the object to be displayed from the object display area, he can also access an object aggregation page by a triggering operation on the object display area (for example, clicking on a top portal control, clicking on a bottom portal control, etc.), so that the viewer can browse some candidate objects that match a target object (for example, a product clicked by the user last or a product in an explanation state, etc.) among objects to be displayed from the object aggregation page such that the viewer can not only select his favorite object from at least one object to be displayed corresponding to the video playing page, but also select his favorite object from the object aggregation page, which can effectively expand an object selection range of the viewer, thus being beneficial to better meeting the viewer's object selection requirements and further improving the user experience of the viewer.

It can be seen that the above object aggregation page is opened by triggering a simple operation (for example, clicking the top portal control, clicking the bottom portal control, etc.) for the object display area in the video playing page, so that the opening operation of the object aggregation page is very simple, so that the viewer of the video playing page can obtain objects other than the at least one object to be displayed corresponding to the video playing page through this simple operation. In this way, complexity of operation of viewing these other objects by the viewer can be effectively reduced, so that adverse reactions caused by high operational complexity can be effectively avoided, and the user experience can be improved.

It should be noted that, in the embodiment of the present application, the above "historical operation information" and so on do not involve user sensitive information, and the information such as "historical operation information" is obtained and used after being permitted by the user. In one example, before obtaining the "historical operation information", the corresponding interface displays prompt information related to obtaining data use permission, which informs the user of the type, use scope, use scenario, etc. of personal information involved in this disclosure in an appropriate way according to relevant laws and regulations, so that the user can determine whether to permit based on the prompt information. It can be understood that the above process of notifying and obtaining user authorization is only schematic, and does not limit the implementation of the present disclosure. Other ways to meet relevant laws and regulations can also be applied to the implementation of the present disclosure.

Besides, an embodiment of the present application further provides an electronic device comprising: a processor and a memory; the memory is configured for storing an instruction or a computer program; and the processor is configured for executing the instruction or computer program in the memory, to cause the electronic device to execute any implementation of the object display method provided by an embodiment of the present application.

Figure 9:
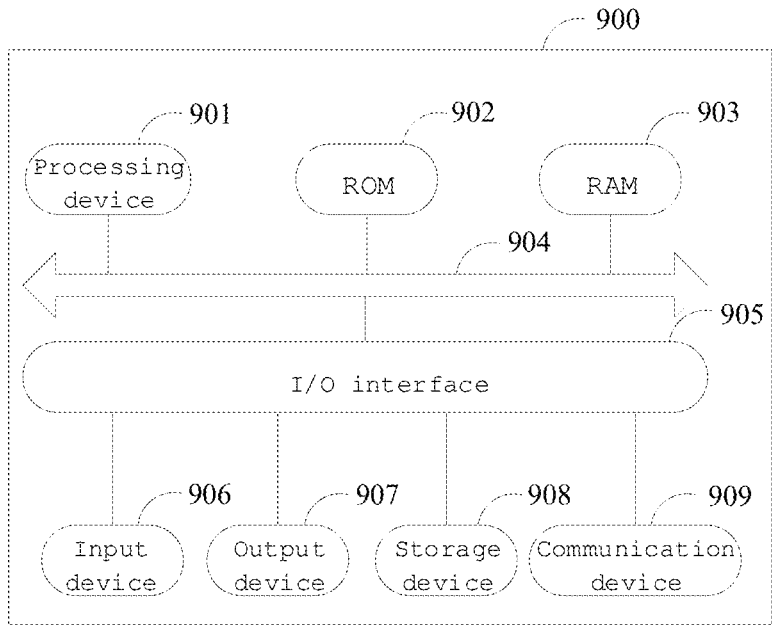
FIG. 9 is a schematic structural diagram of an electronic device provided by an embodiment of the present application.

FIG. 9 shows a structural schematic diagram of an electronic device 900 adapted for implementing an embodiment of the present disclosure. The terminal equipment in the embodiment of the present disclosure may include, but is not limited to, a mobile terminal such as a mobile phone, a notebook computer, a digital streaming receiver, a PDA (Personal Digital Assistant), a PAD (Tablet Computer), a PMP (Portable Multimedia Player), a vehicle-mounted terminal (such as a vehicle-mounted navigation terminal) and the like, and a fixed terminal such as a digital TV, a desktop computer and the like. The electronic device shown in FIG. 9 is only an example, and should not be construed to limit function and application scope of the embodiment of the present disclosure.

As shown in FIG. 9, an electronic device 900 may include a processing device (e.g., a central processor, a graphics processor, etc.) 901, which may perform various appropriate actions and processes according to a program stored in a read-only memory (ROM) 902 or a program loaded into a random access memory (RAM) 903 from a storage device 908. In the RAM 903, various programs and data required for operation of the electronic apparatus 900 are also stored. The processing device 901, the ROM 902 and the RAM 903 are connected to each other through a bus 904. An input/output (I/O) interface 905 is also connected to the bus 904.

Generally, the following devices can be connected to the I/O interface 905: an input device 906 including, for example, a touch screen, a touch pad, a keyboard, a mouse, a camera, a microphone, an accelerometer, a gyroscope, etc.; an output device 907 including, for example, a liquid crystal display (LCD), a speaker, a vibrator, etc.; a storage device 908 including, for example, a magnetic tape, a hard disk, etc.; and a communication device 909. The communication device 909 may allow the electronic device 900 to communicate wirelessly or wiredly with other devices to exchange data. Although FIG. 9 shows an electronic device 900 with various devices, it should be understood that it is not required to implement or have all the devices shown. More or fewer devices may alternatively be implemented or provided.

In particular, according to an embodiment of the present disclosure, the process described above with reference to the flowchart can be implemented as a computer software program. For example, the embodiment of the present disclosure comprises a computer program product comprising a computer program carried on a non-transient computer-readable medium, the computer program including program code for executing the method shown in the flow chart. In such an embodiment, the computer program can be downloaded and installed from the network through the communication device 909, or installed from the storage device 908, or installed from the ROM 902. When the computer program is executed by the processing device 901, the above function defined in the method of the embodiment of the present disclosure is performed.

The electronic apparatus provided by the embodiment of this disclosure belongs to the same inventive concept as the method provided by the above embodiment, and the technical details not described in detail in this embodiment can be found in the above embodiment, and this embodiment has the same advantageous effects as the above embodiment.

An embodiment of the present application further provides a computer-readable medium, in which an instruction or computer program is stored, which instruction or computer program, when run on a device, causes the device to implement the object display method provided by an embodiment of the present application.

It should be noted that the computer-readable medium mentioned above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device or unit, or any combination of the above. More examples of computer-readable storage media may include, but are not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium can be any tangible medium containing or storing a program, which program can be used by or in combination with an instruction execution system, device or unit. In the present disclosure, a computer-readable signal medium may include a data signal propagated in baseband or as part of a carrier wave, in which computer-readable program code is carried. This propagated data signal can take many forms, including but not limited to an electromagnetic signal, an optical signal or any suitable combination of the above. A computer-readable signal medium can also be any computer-readable medium other than a computer-readable storage medium, which can send, propagate or transmit a program for use by or in connection with an instruction execution system, device or unit. Program code contained in the computer-readable medium can be transmitted by any suitable medium, including but not limited to: a wire, an optical cable, a RF (radio frequency) and the like, or any suitable combination of the above.

In some embodiments, the client and the server can communicate by using any currently known or future developed network protocol such as HTTP (HyperText Transfer Protocol), and can be interconnected with digital data communication in any form or medium (for example, communication network). Examples of communication network include a local area network ("LAN"), a wide area network ("WAN"), an internet (for example, the Internet) and an end-to-end network (for example, ad hoc end-to-end network), as well as any currently known or future developed network.

The computer-readable medium may be included in the electronic device; or it can exist independently without being assembled into the electronic device.

The computer-readable medium carries one or more programs, which, when executed by the electronic device, cause the electronic device to perform the method of the present disclosure.

Computer program codes for performing operations of the present disclosure may be written in one or more programming languages or their combinations, including but not limited to object-oriented programming languages, such as Java, Smalltalk, C++, and conventional procedural programming languages, such as "C" language or similar programming languages. The program code can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architecture, functions and operations of possible implementations of systems, methods and computer program products according to various embodiments of the present disclosure. In this regard, each block in the flowchart or block diagram may represent a module, a program segment, or part of codes that contains one or more executable instructions for implementing a specified logical function. It should also be noted that in some alternative implementations, the function noted in the block may occur in a different order than that noted in the drawing. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

Units involved in the embodiment described in the present disclosure can be realized by software or hardware. Wherein names of units/modules do not constitute limitation of the units themselves in some cases.

Functions described above herein may be at least partially performed by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present disclosure, a machine-readable medium may be a tangible medium that may contain or store a program for use by or in connection with an instruction execution system, device or apparatus. The machine-readable medium may be a machine-readable signal medium or a machine-readable storage medium. A machine-readable medium may include, but is not limited to, an electronic, magnetic, optical, electromagnetic, infrared, or semiconductor system, device or apparatus, or any suitable combination of the above. More specific examples of the machine-readable storage medium may include an electrical connection based on one or more lines, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

It should be noted that each embodiment in this description is described in a progressive way, and each embodiment focuses on the differences from other embodiments, so that it is only necessary to refer to the same and similar parts between each embodiment. As for the system or apparatus disclosed in the embodiment, since it corresponds to the method disclosed in the embodiment, the description is relatively simple, and the relevant points can be found in the description of the method portion.

It should be understood that in the present application, "at least one (item)" means one or more, and "multiple" means two or more. "And/or" only describes an associative relationship, which means that there can be three kinds of relationships, for example, A and/or B, which can mean that A exists alone, B exists alone and A and B exist at the same time, where A and B can be singular or plural. The sign "/" generally indicates that the objects before and after are in an "or" relationship. The term "at least one of the following items" or its similar expression refers to any combination of these items, including single items or any combination of multiple items. For example, at least one of a, b, or c can be represented as a, b, c, "a and b", "a and c", "b and c", or "a and b and c", where a, b, and c can be single or multiple.

It should be noted that in this context, relational terms such as "first" and "second" are only used to distinguish one entity or operation from another entity or operation, and do not necessarily require or imply that there is any such actual relationship or order between these entities or operations. Moreover, terms "comprising", "including" or any other variation thereof are intended to cover non-exclusive inclusion, so that a process, method, article or apparatus including a series of elements includes not only those elements, but also other elements not explicitly listed or elements inherent to such process, method, article or apparatus. Without further restrictions, an element defined by the phrase "comprising one" does not exclude the existence of other identical elements in the process, method, article or apparatus comprising the element.

The steps of a method or algorithm described in conjunction with the embodiments disclosed herein can be directly implemented using hardware, software modules executed by a processor, or a combination of both. The software module can be placed in random access memory (RAM), internal memory, read-only memory (ROM), electrically programmable ROM, electrically erasable programmable ROM, register, hard disk, removable disk, CD-ROM, or any other storage medium known in the technical field.

The foregoing description of the disclosed embodiments enables those skilled in the art to implement or use the present application. Many modifications to these embodiments will be obvious to those skilled in the art, and the general principles defined herein can be implemented in other embodiments without departing from the spirit or scope of the present application. Therefore, the present application will not be limited to the embodiments described herein, but is to be accorded the widest scope consistent with the principles and novel features disclosed herein.

What is claimed is:

1. An object display method, comprising:
displaying a plurality of objects to be displayed corresponding to a video playing page in an object display area of the video playing page; and
displaying an object aggregation page in response to a triggering operation on the object display area; wherein the object aggregation page is configured for displaying at least one candidate object; a matching degree between the candidate object and a target object meets a preset matching condition; the target object is determined from the plurality of objects to be displayed according to description information of the plurality of objects to be displayed, wherein
in response to the plurality of objects to be displayed comprising a plurality of first objects, and description information of the first object comprising historical operation information of the first objects, the target object is determined from the first plurality of objects according to the historical operation information of the plurality of first objects;

the target object is an object to be referenced in the plurality of first objects; the historical operation information of the object to be referenced indicates that before the triggering operation on the object display area occurs, a time difference between time of occurrence of a target operation triggered with respect to the object to be referenced and time of occurrence of the triggering operation on the object display area is smaller than that with respect to another object in the plurality of first objects; and the target operation comprises at least one of an information viewing operation, staying time on an information introduction page of the object to be referenced reaching a preset time threshold, a collecting operation, an ordering operation or a selecting operation.

2. The method according to claim 1, wherein the object aggregation page is a platform page; and a similarity between the candidate object and the target object meets a preset similarity condition; the candidate object is different from each of said objects to be displayed.

3. The method according to claim 1, wherein the description information comprises state information; and in response to the first object not existing in the plurality of objects to be displayed, the target object is determined from the plurality of objects to be displayed according to the state information of the plurality of objects to be displayed.

4. The method according to claim 3, wherein the target object is a second object of the plurality of objects to be displayed, and the state information of the second object meets a preset state condition.

5. The method according to claim 4, wherein the video playing page is a live video page; and the preset state condition is that the state information of the second object indicates that the second object is in an explanation state at time of occurrence of the triggering operation on the object display area.

6. The method according to claim 1, wherein the displaying the object aggregation page comprises:

displaying the object aggregation page in the object display area; wherein the object display area has a size smaller than a size of the video playing page; and after the displaying the object aggregation page in the object display area, the method further comprises:

displaying the object aggregation page in full screen in response to a first operation triggered with respect to the object aggregation page;

or displaying the plurality of objects to be displayed corresponding to the video playing page in the object display area in response to a second operation triggered with respect to the object aggregation page;

or displaying the plurality of objects to be displayed corresponding to the video playing page in the object display area in response to a third operation triggered with respect to an area outside the object display area in the video playing page.

7. The method according to claim 6, wherein after the displaying the object aggregation page in full screen, the method further comprises:

displaying the video playing page in response to a fourth operation triggered with respect to the object aggregation page; the plurality of objects to be displayed corresponding to the video playing page is displayed in the object display area of the video playing page.

8. The method according to claim 1, wherein the object display area displays a control to be used; and the displaying the object aggregation page in response to a triggering operation on the object display area comprises:

displaying the object aggregation page in response to a triggering operation on the control to be used.

9. The method according to claim 8, wherein guidance content is displayed on the control to be used;

the guidance content is determined according to category description information of the target object; and the method further comprises:

in response to the target object being updated, updating the guidance content displayed on the control to be used.

10. The method according to claim 1, wherein the plurality of objects to be displayed are displayed in the object display area according to a preset order;

the displaying the object aggregation page in response to a triggering operation on the object display area comprises:

in response to an object to be displayed at a last position in the preset order being displayed in the object display area, displaying the object aggregation page in response to a preset operation triggered with respect to the object display area.

11. An electronic device, comprising a processor and a memory, the memory being configured for storing an instruction or a computer program, and the processor being configured for executing the instruction or computer program in the memory, to cause the electronic device to implement an object display method, the method comprising:

displaying a plurality of objects to be displayed corresponding to a video playing page in an object display area of the video playing page; and displaying an object aggregation page in response to a triggering operation on the object display area; wherein the object aggregation page is configured for displaying at least one candidate object; a matching degree between the candidate object and a target object meets a preset matching condition; the target object is determined from the plurality of objects to be displayed according to description information of the plurality of objects to be displayed, wherein in response to the plurality of objects to be displayed comprising a plurality of first objects, and description information of the first objects comprising historical operation information of the first objects, the target object is determined from the plurality of first objects according to the historical operation information of the plurality of first objects;

the target object is an object to be referenced in the plurality of first objects; the historical operation information of the object to be referenced indicates that before the triggering operation on the object display area occurs, a time difference between time of occurrence of the target operation triggered with respect to the object to be referenced and time of occurrence of the triggering operation on the object display area is smaller than that with respect to another object in the plurality of first objects; and the target operation comprises an information viewing operation, staying time on an information introduction page of the object to be referenced reaching a preset time threshold, a collecting operation, an ordering operation or a selecting operation.

12. The electronic device according to claim 11, wherein the object aggregation page is a platform page; and a similarity between the candidate object and the target object meets a preset similarity condition; the candidate object is different from each of said objects to be displayed.

13. The electronic device according to claim 11, wherein the description information comprises state information; and in response to the first object not existing in the plurality of objects to be displayed, the target object is determined from the plurality of objects to be displayed according to the state information of the plurality of objects to be displayed.

14. A non-transitory computer-readable storage medium, wherein an instruction or a computer program is stored in the non-transitory computer-readable storage medium, which instruction or computer program, when run on a device, causes the device to implement an object display method, the method comprising:

displaying a plurality of objects to be displayed corresponding to a video playing page in an object display area of the video playing page; and displaying an object aggregation page in response to a triggering operation on the object display area; wherein the object aggregation page is configured for displaying at least one candidate object; a matching degree between the candidate object and a target object meets a preset matching condition; the target object is determined from the plurality of objects to be displayed according to description information of the plurality of objects to be displayed, wherein in response to the plurality of objects to be displayed comprising a plurality of first objects, and description information of the first objects comprising historical operation information of the first objects, the target object is determined from the plurality of first objects according to the historical operation information of the plurality of first objects;

the target object is an object to be referenced in the plurality of first objects; the historical operation information of the object to be referenced indicates that before the triggering operation on the object display area occurs, a time difference between time of occurrence of a target operation triggered with respect to the object to be referenced and time of occurrence of the triggering operation on the object display area is smaller than that with respect to another object in the plurality of first objects; and the target operation comprises at least one of an information viewing operation, staying time on an information introduction page of the object to be referenced reaching a preset time threshold, a collecting operation, an ordering operation or a selecting operation.

\* \* \* \* \*